(12) United States Patent
Wang (10) Patent No.: US 12,181,915 B2
(45) Date of Patent: Dec. 31, 2024

(54) DISPLAY MODULE AND MANUFACTURING METHOD THEREOF

(71) Applicant: WUHAN CHINA STAR OPTOELECTRONICS SEMICONDUCTOR DISPLAY TECHNOLOGY CO., LTD., Hubei (CN)

(72) Inventor: Peng Wang, Hubei (CN)

(73) Assignee: WUHAN CHINA STAR OPTOELECTRONICS SEMICONDUCTOR DISPLAY TECHNOLOGY CO., LTD, Hubei (CN)

( * ) Notice: Subject to any disclaimer, the term of this patent is extended or adjusted under 35 U.S.C. 154(b) by 801 days.

(21) Appl. No.: 17/275,201

(22) PCT Filed: Dec. 31, 2020

(86) PCT No.: PCT/CN2020/142101
§ 371 (c)(1),
(2) Date: Mar. 11, 2021

(87) PCT Pub. No.: WO2022/141396
PCT Pub. Date: Jul. 7, 2022

(65) Prior Publication Data
US 2023/0341895 A1  Oct. 26, 2023

(30) Foreign Application Priority Data
Dec. 30, 2020 (CN) .......................... 202011599050.8

(51) Int. Cl.
*G06F 1/16* (2006.01)
*B32B 3/30* (2006.01)

(52) U.S. Cl.
CPC .............. *G06F 1/1601* (2013.01); *B32B 3/30* (2013.01); *B32B 2571/00* (2013.01)

(58) Field of Classification Search
CPC ...... B32B 3/30; B32B 2571/00; G06F 1/1601
See application file for complete search history.

(56) References Cited

U.S. PATENT DOCUMENTS

2011/0043486 A1* 2/2011 Hagiwara ......... G02F 1/133514
345/207
2021/0278721 A1* 9/2021 Yu ..................... G02F 1/133514

FOREIGN PATENT DOCUMENTS

| CN | 1347068 A | 5/2002 |
|---|---|---|
| CN | 203519978 U | 4/2014 |
| CN | 104280923 A | 1/2015 |
| CN | 105093697 A | 11/2015 |
| CN | 105118042 A | 12/2015 |

(Continued)

*Primary Examiner* — Christopher M Polley
*Assistant Examiner* — Sathavaram I Reddy
(74) *Attorney, Agent, or Firm* — PV IP PC; Wei Te Chung (57) ABSTRACT

A display module and a manufacturing method thereof are provided, which include a display panel having a display region, and a protective layer attached to a back surface of the display region. Wherein, at least two alignment marks are disposed on peripheral sides of the display region, at least two alignment grooves are defined on peripheral sides of the protective layer, and the alignment grooves respectively one-to-one correspond to the alignment marks to align and attach the protective layer to the back surface of the display region.

7 Claims, 4 Drawing Sheets

(56) References Cited

FOREIGN PATENT DOCUMENTS

| | | | | |
|---|---|---|---|---|
| CN | 109166474 A | | 1/2019 | |
| CN | 110429105 A | | 11/2019 | |
| CN | 110618552 A | * | 12/2019 | ....... G02F 1/133512 |
| CN | 111276053 A | | 6/2020 | |
| CN | 111276634 A | | 6/2020 | |
| JP | 2002365617 A | | 12/2002 | |
| KR | 20190057829 A | | 5/2019 | |

* cited by examiner

DISPLAY MODULE AND MANUFACTURING METHOD THEREOF

BACKGROUND OF INVENTION

Field of Invention

The present disclosure relates to the field of display technology, and particularly to a display module and a manufacturing method thereof.

Description of Prior Art

With development of display module technology, bezels of display modules are increasingly narrower, and requirements of attachment accuracy for display modules are increasingly higher.

In order to protect back surfaces of display panels, protective layers are usually attached to the back surfaces of the display panels to buffer environmental impact. When the protective layers are attached to the back surfaces of the display panels, attachment areas need to be enlarged as much as possible, and distances between edges of the protective layers and edges of the display surfaces are as short as possible (usually they need to be controlled below 0.05 mm). However, because ability of attachment processes of current equipment is limited, and edge positions of the display panels are difficult to be obtained accurately by image collecting devices, at least partial edges of the protective layers are prone to expand beyond the edges of the display panels, and the attachment accuracy is difficult to be confirmed. Therefore, accurate alignment is impossible.

SUMMARY OF INVENTION

The present disclosure provides a display module and a manufacturing method thereof, which solve the problem that the attachment accuracy of the protective layers attached to the back surfaces of the display panels is difficult to be confirmed.

The present disclosure provides a display panel, including:
- a display panel having a display region, wherein the display region has peripheral sides and a back surface; and
- a protective layer attached to the back surface of the display region, wherein the protective layer has peripheral sides;
- wherein at least two alignment marks are disposed on the peripheral sides of the display region, at least two alignment grooves are defined on the peripheral sides of the protective layer, the alignment grooves respectively one-to-one correspond to the alignment marks to align and attach the protective layer to the back surface of the display region;
- the alignment mark has a first lateral surface and a second lateral surface disposed oppositely, the alignment groove has an opening and a bottom section;
- the first lateral surface is located on a side of the bottom section away from the alignment groove, the second lateral surface is located on a side of the bottom section close to the alignment groove;
- distances between the first lateral surface of the alignment mark and the correspondingly defined opening of the alignment groove or distances between the second lateral surface of the alignment mark and the correspondingly disposed bottom section of the alignment groove are dimensions of confirmed accuracy of the protective layer attached to the back surface of the display region.

In one embodiment of the present disclosure, two of the alignment marks are disposed on any peripheral side of the display region, two of the alignment grooves are defined on the corresponding peripheral sides of the protective layer, and the alignment grooves respectively one-to-one correspond to the alignment marks.

In one embodiment of the present disclosure, two adjacent peripheral sides of the display region are respectively provided with one of the alignment marks, two adjacent peripheral sides of the protective layer are respectively provided with one of the alignment grooves, and the alignment grooves respectively one-to-one correspond to the alignment marks.

In one embodiment of the present disclosure, two adjacent peripheral sides of the display region are respectively provided with two of the alignment marks, two adjacent peripheral sides of the protective layer are respectively provided with two of the alignment grooves, and the alignment grooves respectively one-to-one correspond to the alignment marks.

In one embodiment of the present disclosure, the alignment grooves penetrate the protective layer.

In one embodiment of the present disclosure, the protective layer includes at least one of lattice gel, acrylic foam, polyimide, graphite, or copper foil.

According to the above-mentioned purpose of the present disclosure, a display module is provided, which includes:
- a display panel having a display region, wherein the display region has peripheral sides and a back surface; and
- a protective layer attached to the back surface of the display region, wherein the protective layer has peripheral sides;
- wherein at least two alignment marks are disposed on the peripheral sides of the display region, at least two alignment grooves are defined on the peripheral sides of the protective layer, the alignment grooves respectively one-to-one correspond to the alignment marks to align and attach the protective layer to the back surface of the display region.

In one embodiment of the present disclosure, two of the alignment marks are disposed on any peripheral side of the display region, two of the alignment grooves are defined on the corresponding peripheral sides of the protective layer, and the alignment grooves respectively one-to-one correspond to the alignment marks.

In one embodiment of the present disclosure, two adjacent peripheral sides of the display region are respectively provided with one of the alignment marks, two adjacent peripheral sides of the protective layer are respectively provided with one of the alignment grooves, and the alignment grooves respectively one-to-one correspond to the alignment marks.

In one embodiment of the present disclosure, two adjacent peripheral sides of the display region are respectively provided with two of the alignment marks, two adjacent peripheral sides of the protective layer are respectively provided with two of the alignment grooves, and the alignment grooves respectively one-to-one correspond to the alignment marks.

In one embodiment of the present disclosure, the alignment marks have a first lateral surface and a second lateral surface disposed oppositely, and the alignment grooves have an opening and a bottom section;

the first lateral surface is located on a side of the bottom section away from the alignment grooves, and the second lateral surface is located on a side close to the bottom section of the alignment grooves; and distances between the first lateral surface of the alignment mark and the correspondingly defined opening of the alignment groove or distances between the second lateral surface of the alignment mark and the correspondingly disposed bottom section of the alignment groove are dimensions of confirmed accuracy of the protective layer attached to the back surface of the display region.

In one embodiment of the present disclosure, the alignment grooves penetrate the protective layer.

In one embodiment of the present disclosure, the protective layer includes at least one of lattice gel, acrylic foam, polyimide, graphite, or copper foil.

According to the above-mentioned purpose of the present disclosure, the present disclosure further provides a manufacturing method of the display module is provided, which includes:

providing a display panel, wherein the display panel has a display region, the display region has peripheral sides and a back surface, and at least two alignment marks are disposed on the peripheral sides of the display region;

providing a protective layer, wherein the protective layer has peripheral sides, and at least two alignment grooves are defined on the peripheral sides of the protective layer; and attaching the protective layer to the back surface of the display region, and corresponding the alignment grooves to the alignment marks one-to-one, respectively.

In one embodiment of the present disclosure, the step of attaching the protective layer to the back surface of the display region and the corresponding the alignment grooves to the alignment marks one-to-one respectively includes:

attaching the protective layer to the back surface of the display region, corresponding the alignment grooves to the alignment marks one-to-one respectively, obtaining distances between the alignment mark and corresponding alignment grooves to act as dimensions of confirmed accuracy; and adjusting an attaching position of the protective layer according to the dimension of confirmed accuracy to align and attach the protective layer to the back surface of the display region.

In one embodiment of the present disclosure, the alignment mark has a first lateral surface and a second lateral surface disposed oppositely, the alignment groove has an opening and a bottom section;

the first lateral surface is located on a side of the bottom section away from the alignment groove, the second lateral surface is located on a side of the bottom section close to the alignment groove;

the step of obtaining the distances between the alignment mark and corresponding alignment grooves to act as dimensions of confirmed accuracy includes obtaining distances between the first lateral surface of the alignment marks and the correspondingly defined opening of the alignment grooves, or obtaining distances between the second lateral surface of the alignment marks and the correspondingly disposed bottom section of the alignment grooves to act as the dimensions of confirmed accuracy of the protective layer attached to the back surface of the display region.

Compared to the prior art, by disposing the at least two alignment marks on the peripheral sides of the display region, by defining at least two alignment grooves on the peripheral sides of the protective layer, wherein the alignment grooves respectively one-to-one correspond to the alignment marks, and by measuring the distance between the alignment mark and the alignment groove to indirectly obtain the dimension of confirmed accuracy of the protective layer attached to the back surface of the display region, the display module and the manufacturing method thereof provided by the present disclosure solve the problem that the attachment accuracy of the protective layers attached to the back surfaces of the display panels is difficult to be confirmed.

DESCRIPTION OF DRAWINGS

The technical solutions and other advantageous effects of the present invention will be apparent with reference to the following accompanying drawings and detailed description of embodiments of the present disclosure.

DETAILED DESCRIPTION OF PREFERRED EMBODIMENTS

The technical solutions in the embodiments of the present disclosure are clearly and completely described in the following with reference to the accompanying drawings in the embodiments of the present disclosure. Obviously, the described embodiments are only part of the embodiments of the present disclosure, but are not all embodiments of the present disclosure. All other embodiments obtained by those skilled in the art based on the embodiments of the present disclosure without creative efforts are within the scope of the present disclosure.

In the description of the present disclosure, it is to be understood that the orientation or positional relationship indicated by the terms center, longitudinal, transverse, length, width, thickness, upper, lower, front, rear, left, right, vertical, horizontal, top, bottom, inside, outside, clockwise, counterclockwise etc. is based on the orientation or positional relationship shown in the accompanying figures, which is merely for the convenience for describing of the present disclosure and for the simplification of the description, and is not intended to indicate or imply that the indicated devices or elements have a specific orientation or is constructed and operated in a specific orientation. Therefore, it should not be understood as a limitation on the present disclosure. Moreover, the terms first and second are used for descriptive purposes only and are not to be understood as indicating or implying relative importance or implicitly indicating the number of the indicated technical characteristics. Therefore, the characteristics defined by first or second may include one or more of the described characteristics either explicitly or implicitly. In the description of the present disclosure, the meaning of a plurality is two or more unless clearly and specifically defined otherwise.

In the description of the present disclosure, unless specified or limited otherwise, terms "mounted," "connected," "coupled," and the like are used in a broad sense, and may include, for example, fixed connections, detachable connections, or integral connections; may also be mechanical or electrical connections or may be communication between each other; may also be direct connections or indirect connections via intervening structures; may also be inner communications of two elements or may be a relationship of interaction between two elements. For persons skilled in the art in this field, the specific meanings of the above terms in the present disclosure can be understood with specific cases.

In the present disclosure, unless expressly specified or limited otherwise, a first feature is "on" or "beneath" a second feature may include that the first feature directly contacts the second feature and may also include that the first feature does not directly contact the second feature. Furthermore, a first feature "on," "above," or "on top of" a second feature may include an embodiment in which the first feature is right "on," "above," or "on top of" the second feature and may also include that the first feature is not right "on," "above," or "on top of" the second feature, or just means that the first feature has a sea level elevation higher than the sea level elevation of the second feature. While first feature "beneath," "below," or "on bottom of" a second feature may include that the first feature is "beneath," "below," or "on bottom of" the second feature and may also include that the first feature is not right "beneath," "below," or "on bottom of" the second feature, or just means that the first feature has a sea level elevation lower than the sea level elevation of the second feature.

The following disclosure provides many different embodiments or examples for implementing the different structures of the present disclosure. In order to simplify the disclosure of the present disclosure, the components and configurations of the specific examples are described below. In order to simplify the disclosure of the present disclosure, the components and configurations of the specific examples are described below. Of course, they are merely examples and are not intended to limit the present disclosure. In addition, the present disclosure may repeat reference numerals and/or reference numerals in different examples, which are for the purpose of simplicity and clarity, and do not indicate the relationship between the various embodiments and/or arrangements discussed. Moreover, the present disclosure provides embodiments of various specific processes and materials, but one of ordinary skill in the art will recognize the use of other processes and/or the use of other materials.

The present disclosure is aimed at the problem that attachment accuracy is difficult to be confirmed when the protective layers are attached to the back surfaces of the display panels in current display modules. Embodiments of the present disclosure are used to solve the problem.

Figure 1:
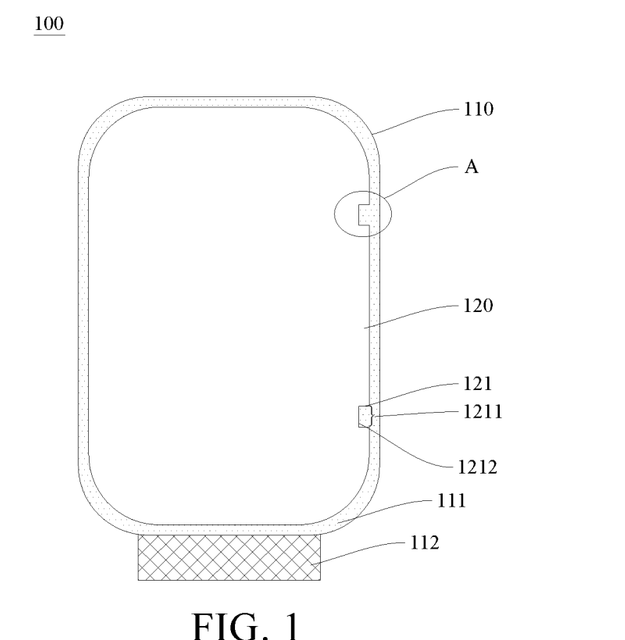
FIG. 1 is a structural schematic diagram of a display module according to a first embodiment of the present disclosure.
Figure 5:
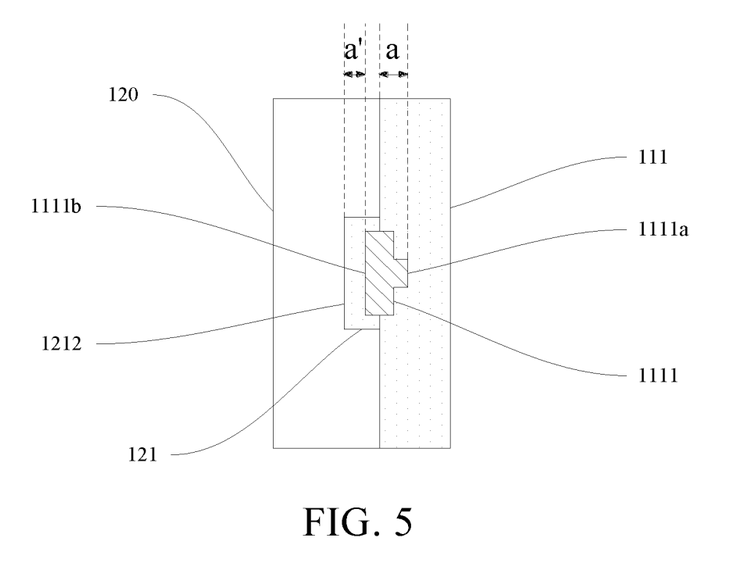
FIG. 5 is an enlarged schematic diagram of location A in FIG. 1.

FIG. 1 is a structural schematic diagram of a display module according to a first embodiment of the present disclosure. FIG. 5 is an enlarged schematic diagram of location A in FIG. 1. Please refer to FIG. 1 and FIG. 5, the display module 100 includes: a display panel 110 having a display region 111 and a non-display region 112, wherein the display region 111 has peripheral sides and a back surface; and a protective layer 120 attached to the back surface of the display region 111, wherein the protective layer 120 has peripheral sides; wherein at least two alignment marks 1111 are disposed on the peripheral sides of the display region 111, at least two alignment grooves 121 are defined on the peripheral sides of the protective layer 120, the alignment grooves 121 respectively one-to-one correspond to the alignment marks 1111 to align and attach the protective layer 120 to the back surface of the display region 111.

Furthermore, the protective layer 120 has a buffer function and a heat-equalizing function and serves a protection effect on the display panel 110. Preferably, a material of the protective layer 120 can include at least one of lattice gel, acrylic foam, polyimide, graphite, or copper foil.

In current display modules, when the protective layers are attached to the back surfaces of the display panels, pitches between edges of the protective layers and edges of the display surfaces are as small as possible, and they usually need to be controlled below 0.05 mm. However, because ability of attachment processes of current equipment is limited, and edge positions of the display panels may be shielded by the protective layers, edge positions of the display panels are difficult to be obtained accurately by image collecting devices, and the attachment accuracy is difficult to be confirmed, thereby resulting in difficulty in realizing accurate alignment. In the display module provided by the embodiments of the present disclosure, at least two alignment marks 1111 are disposed on the peripheral sides of the display region 111 of the display panel 110; at least two alignment grooves 121 are defined on the peripheral sides of the protective layer 120; the alignment grooves 121 respectively one-to-one correspond to the alignment marks 1111; and the alignment grooves 121 penetrate the protective layer 120. Furthermore, a depth of the alignment grooves 121 is deep enough to ensure that the edges of the alignment marks 1111 can always be exposed but not be shielded. Even when the protective layer 120 is not aligned to and attached to the back surface of the display region 111, by obtaining the distances between the edge of the alignment mark 1111 and the alignment groove 121, a dimension of attachment accuracy of the protective layer 120 attached to the back surface of the display region 111 can be obtained indirectly, which solves the problem that the dimension of attachment accuracy is difficult to be confirmed and makes the protective layer 120 accurately align to and attach to the back surface of the display region 111.

Furthermore, disposing the at least two alignment marks 1111 on the peripheral sides of the display region 111 and defining the at least two alignment grooves 121 on the peripheral sides of the protective layer 120 are conducive to improving attachment accuracy and reducing influence from deviation of single dimension of attachment accuracy.

Figure 2:
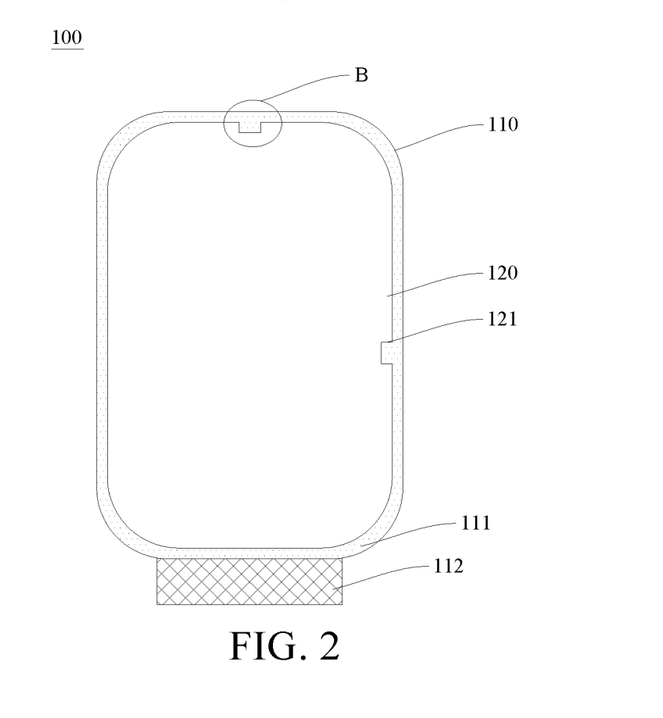
FIG. 2 is a structural schematic diagram of the display module according to a second embodiment of the present disclosure.
Figure 6:
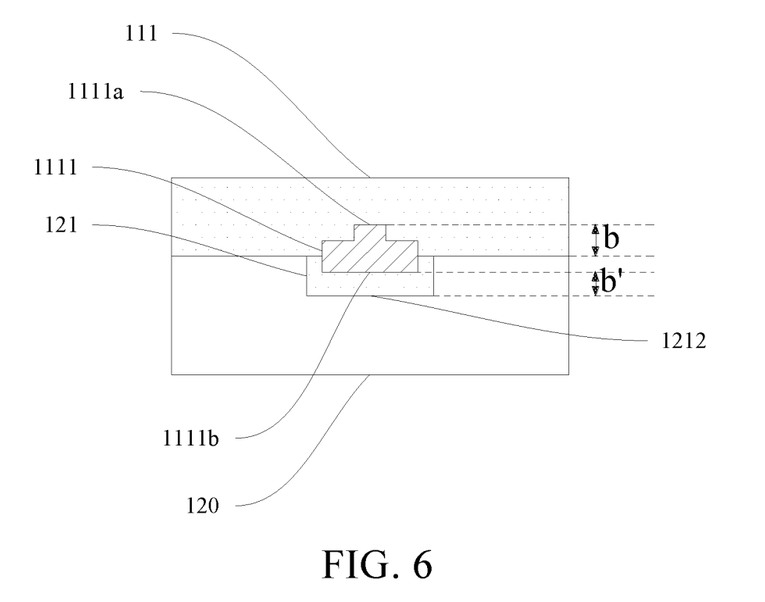
FIG. 6 is an enlarged schematic diagram of location B in FIG. 2.

FIG. 2 is a structural schematic diagram of the display module according to a second embodiment of the present disclosure. FIG. 6 is an enlarged schematic diagram of location B in FIG. 2. Please refer to FIG. 2 and FIG. 6, two adjacent peripheral sides of the display region 111 are respectively provided with one of the alignment marks 1111; two adjacent peripheral sides of the protective layer 120 are respectively provided with one of the alignment grooves 121, and the alignment grooves 121 respectively one-to-one correspond to the alignment marks 1111.

By disposing one of the alignment marks 1111 on two adjacent peripheral sides of the display region 111 respectively, and by defining one of the alignment grooves 121 on two adjacent peripheral sides of the protective layer 120 correspondingly, the dimensions of attachment accuracy of the protective layer 120 attaching to the back surface of the display region 111 in two directions, that is, a length direction and a width direction of the display panel 110, can be obtained. That is to say, the dimensions of attachment accuracy in X direction and Y direction are obtained, which is more conducive to alignment and attaching of the protective layer 120 to the back surface of the display region 111.

Figure 3:
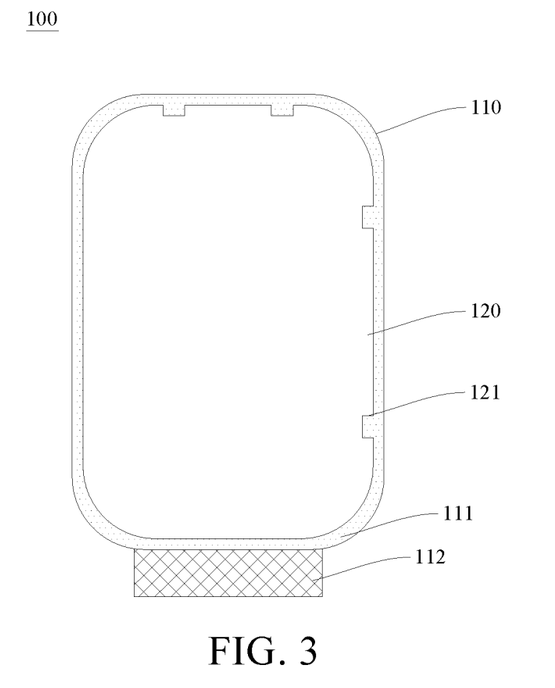
FIG. 3 is a structural schematic diagram of the display module according to a third embodiment of the present disclosure.

FIG. 3 is a structural schematic diagram of the display module according to a third embodiment of the present disclosure. Please refer to FIG. 3, two adjacent peripheral sides of the display region 111 are respectively provided with two of the alignment marks 1111; two adjacent peripheral sides of the protective layer 120 are respectively provided with two of the alignment grooves 121, and the alignment grooves 121 respectively one-to-one correspond to the alignment marks 1111.

By disposing the plurality of alignment marks 1111 on two adjacent peripheral sides of the display region 111, and by defining the plurality of alignment grooves 121 on two adjacent peripheral sides of the protective layer 120, the obtained dimension of attachment accuracy in the length direction and the width direction of the display panel 110, that is, the X direction and the Y direction, can be more accurate, which reduces influence from deviation of single dimension of attachment accuracy.

Figure 4:
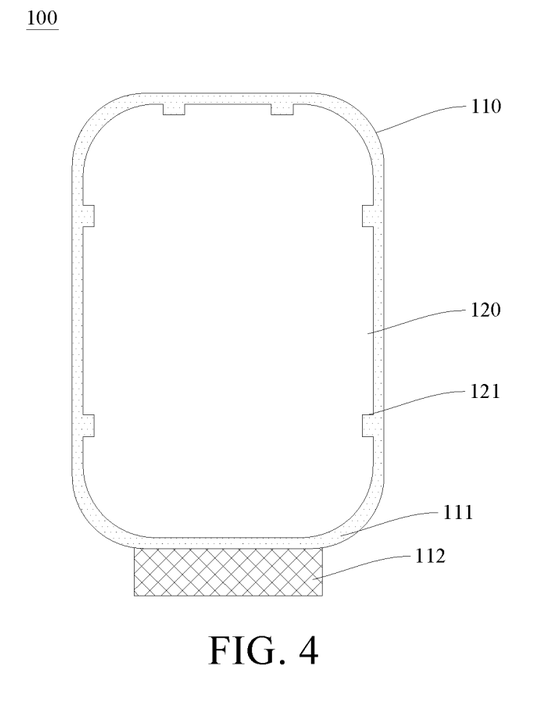
FIG. 4 is a structural schematic diagram of the display module according to a fourth embodiment of the present disclosure.

FIG. 4 is a structural schematic diagram of the display module according to a fourth embodiment of the present disclosure. Please refer to FIG. 4, except for the peripheral side of the display region 111 close to the non-display region 112, the other three peripheral sides are respectively provided with two alignment marks 1111, and the three peripheral sides of the protective layer 120 are respectively provided with two alignment grooves 121 correspondingly.

By disposing the plurality of alignment marks 1111 and the plurality of alignment grooves 121 corresponding to each other, dimensions of confirmed accuracy can be obtained on the plurality of sides of the display region 111, which is conducive to confirming whether the protective layer 120 does align to and attach to the back surface of the display region 111.

Furthermore, refer to FIG. 1, FIG. 5, and FIG. 6 in the aforesaid embodiments, the alignment mark 1111 has a first lateral surface 1111a and a second lateral surface 1111b disposed oppositely, and the alignment groove 121 has an opening 1211 and a bottom section 1212. Wherein, the first lateral surface 1111a is located on a side of the bottom section 1212 away from the alignment groove 121, and the second lateral surface 1111b is located on a side of the bottom section 1212 close to the alignment groove 121.

When the two adjacent peripheral sides of the display region 111 are provided with at least one of the alignment marks 1111, and the two adjacent peripheral sides of the protective layer 120 are respectively provided with at least one of the alignment grooves 121, distances between the first lateral surface 1111a of the alignment mark 1111 and the correspondingly defined opening 1211 of the alignment groove 121 or distances between the second lateral surface 1111b of the alignment mark 1111 and the correspondingly disposed bottom section 1212 of the alignment groove 121 are the dimensions of confirmed accuracy of the protective layer 120 attached to the back surface of the display region 111 in the two directions. For example, a distance a and a distance a' illustrated in FIG. 5 are the dimension of confirmed accuracy in the X direction, and a distance b and a distance b' illustrated in FIG. 6 are the dimensions of confirmed accuracy in the Y direction. Furthermore, the distance a and the distance b are the distances between the first lateral surface 1111a and the opening 1211 of the correspondingly disposed alignment groove 121, and the distance a' and the distance b' are the distances between the second lateral surface 1111b and the bottom section 1212 of the correspondingly disposed alignment groove 121.

In the aforesaid embodiments of the present disclosure, a shape of the alignment grooves 121 can be rectangular, and it can be understood that the shape of the alignment grooves 121 is not limited thereto. The shape of the alignment grooves 121 can be determined according to actual cutting processes of the protective layer 120. The alignment marks 1111 are metal patterns manufactured on the peripheral sides of the display region 111.

Figure 7:
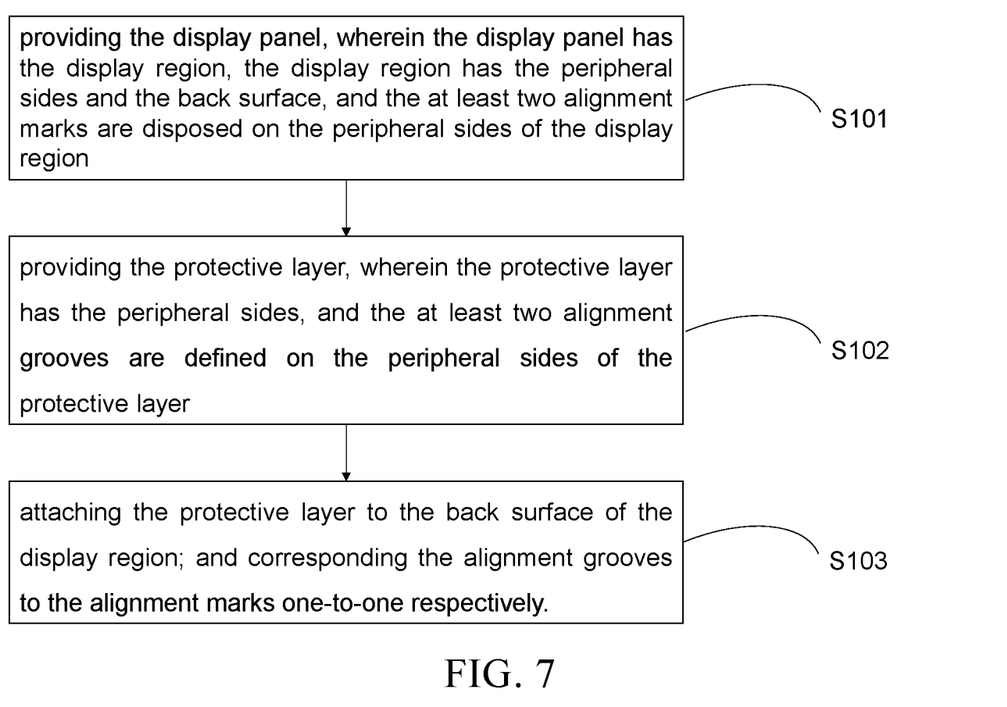
FIG. 7 is a flowchart of a manufacturing method of the display module provided by one embodiment of the present disclosure.

One embodiment of the present disclosure further provides a manufacturing method of the display module. Please refer to FIG. 7, the method includes:

S101: providing the display panel 110, wherein the display panel has the display region 111, the display region 111 has the peripheral sides and the back surface, and the at least two alignment marks 1111 are disposed on the peripheral sides of the display region 111;

S102: providing the protective layer 120, wherein the protective layer 120 has the peripheral sides, and the at least two alignment grooves 121 are defined on the peripheral sides of the protective layer 120;

S103: attaching the protective layer 120 to the back surface of the display region 111; and corresponding the alignment grooves 121 to the alignment marks 1111 one-to-one respectively.

Wherein, in step S101, the structure of the display module 100 can refer to the plurality of structures illustrated in FIG. 1 to FIG. 4, and it is not limited thereto.

Specifically, the step S103 can include:
attaching the protective layer 120 to the back surface of the display region 111, corresponding the alignment grooves 121 to the alignment marks 1111 one-to-one respectively, obtaining the distances between the alignment mark 1111 and corresponding alignment grooves 121 to act as dimensions of confirmed accuracy; and
adjusting an attaching position of the protective layer according to the dimension of confirmed accuracy to align and attach the protective layer 120 to the back surface of the display region 111.

Wherein, as illustrated in FIG. 5 and FIG. 6, the alignment mark 1111 has a first lateral surface 1111a and a second lateral surface 1111b disposed oppositely, and the alignment mark 121 has an opening 1211 and a bottom section 1212. Wherein, the first lateral surface 1111a is located on a side of the bottom section 1212 away from the alignment groove 121, and the second lateral surface 1111b is located on a side of the bottom section 1212 close to the alignment groove 121. Furthermore, obtaining the distances between the first lateral surface 1111a of the alignment mark 1111 and the correspondingly defined opening 1211 of the alignment groove 121, or obtaining the distances between the second lateral surface 1111b of the alignment mark 1111 and the correspondingly disposed bottom section 1212 of the alignment groove 121, the dimensions of confirmed accuracy of the protective layer 120 attached to the back surface of the display region 111 can be obtained.

When the two adjacent peripheral sides of the display region 111 are provided with at least one of the alignment marks 1111, and the two adjacent peripheral sides of the protective layer 120 are respectively provided with at least one of the alignment grooves 121, distances between the first lateral surface 1111a of the alignment mark 1111 and the correspondingly defined opening 1211 of the alignment groove 121 or distances between the second lateral surface 1111b of the alignment mark 1111 and the correspondingly disposed bottom section 1212 of the alignment groove 121 are the dimensions of confirmed accuracy of the protective layer 120 attached to the back surface of the display region 111 in the two directions. For example, a distance a and a distance a' illustrated in FIG. 5 are the dimension of confirmed accuracy in the X direction, and a distance b and a distance b' illustrated in FIG. 6 are the dimensions of confirmed accuracy in the Y direction. Furthermore, the distance a and the distance b are the distances between the first lateral surface 1111a and the opening 1211 of the correspondingly disposed alignment groove 121, and the distance a' and the distance b' are the distances between the second lateral surface 1111b and the bottom section 1212 of the correspondingly disposed alignment groove 121.

When the obtained dimensions of confirmed accuracy in the X direction and the Y direction range within preset dimensions of the X direction and the Y direction, the protective layer 120 is aligned to and attached to the back surface of the display region 111. When at least one of the obtained dimension of confirmed accuracy in the X direction and the Y direction does not range within the corresponding preset dimension, the protective layer 120 is not aligned to and attached to the back surface of the display region 111.

Wherein, the distance a, the distance a', the distance b, and the distance b' can be measured automatically by automated optical inspection (AOI) equipment.

A range of the preset dimensions in the X direction and the Y direction can be adjusted according to different designs of the display module 100, and it generally ranges from 0.05 mm to 0.35 mm.

When inspecting the display module 100 by the AOI equipment, the dimension of confirmed accuracy in at least one direction can be automatically measured. The obtained dimensions of confirmed accuracy are compared to the preset dimension range, whether the protective layer 120 is accurately attached to the back surface of the display region 111 can be known. When the dimensions of confirmed accuracy in the X direction and the Y direction are obtained by the AOI equipment, if one of the two is not within the preset dimension range, it indicates that the protective layer 120 is not accurately aligned to and attached to the back surface of the display region 111.

By disposing the alignment marks 1111, by the alignment grooves 121 respectively one-to-one corresponding to the alignment marks 1111, and by the sufficient depth of the alignment grooves 121 that ensures the lateral surfaces of the alignment marks are not shielded, the display module 100 can be inspected automatically by the AOI equipment. Therefore, there is no need to waste manpower for inspection, which is conducive to reduction of production costs.

Furthermore, please refer to FIG. 2, when the alignment marks 1111 are disposed on the two adjacent peripheral sides of the display region 111, the alignment grooves 121 are also aligned to and disposed on the two adjacent peripheral sides of the protective layer 120. At this time, the dimensions of confirmed accuracy in the Y direction and the X direction can be obtained by the AOI equipment, and an adjustment angle after the protective layer 120 is attached can be obtained according to a ratio between the dimensions of confirmed accuracy in the Y direction and the X direction. Therefore, the protective layer 120 is able to be adjusted.

Specifically, the adjustment angle is $\theta$ or $\theta'$, $\tan\theta=$the dimension of confirmed accuracy in the Y direction/the dimension of confirmed accuracy in the X direction, that is, $\tan\theta=b/a$ or $\tan\theta'=b'/a'$. Then, by inverse trigonometric functions, the adjustment angle $\theta$ or $\theta'$ of the attached protective layer 120 can be obtained as $\theta=\arctan(b/a)$ or $\theta'=\arctan(b'/a')$.

Furthermore, when the protective layer 120 is not attached to the back surface of the display region 111, the peripheral sides of the display region 111 are provided with the plurality of alignment marks 1111, and the peripheral sides of the protective layer 120 are provided with the plurality of alignment grooves 121, the distance a and the distance b are mean values measured by the AOI equipment from the first lateral surface 1111a of the alignment marks 1111 to the opening 1211 of the alignment grooves 121, and the distance a' and the distance b' are mean values measured by the AOI equipment from the second lateral surface 1111b of the alignment marks 1111 to the bottom section 1212 of the alignment grooves 121.

Furthermore, refer to the aforesaid structural embodiments, as illustrated in FIG. 3 and FIG. 4, when two or more of the alignment marks 1111 are disposed on the adjacent peripheral sides of the display region 111, and two or more of the alignment grooves 121 are defined on the adjacent peripheral sides of the protective layer 121, the plurality of dimensions of confirmed accuracy in the X direction and the Y direction are obtained after measurement. At this time, the plurality of dimensions of confirmed accuracy in the Y direction are divided by the plurality of dimensions of confirmed accuracy in the X direction to obtain the plurality of adjustment angles, such as $\theta 1$, $\theta 2$, $\theta 3$, etc. By taking the average of the plurality of adjustment angles, the ultimate adjustment angle is obtained. Then the protective layer 120 is adjusted correspondingly to align and attach the protective layer 120 to the back surface of the display region 111.

The display module and the manufacturing method provided by the embodiments of the present disclosure make the dimension of attachment accuracy be confirmed easily. Furthermore, by measuring dimensions of attachment accuracy by the AOI equipment and comparing to the preset dimension range, whether the protective layer 120 is aligned and attached is known, which is conducive to implementation of automatized manufacturing and reduction of production cost.

The display module and the manufacturing method thereof provided by the embodiments of present disclosure are described in detail above. This article uses specific cases for describing the principles and the embodiments of the present disclosure, and the description of the embodiments mentioned above is only for helping to understand the method and the core idea of the present disclosure. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present disclosure.

What is claimed is:
1. A display module, comprising:
 a display panel having a display region, wherein the display region has peripheral sides and a back surface; and
 a protective layer attached to the back surface of the display region, wherein the protective layer has peripheral sides;

wherein the peripheral sides of the protective layer are disposed within the peripheral sides of the display region;

wherein at least two alignment marks are disposed on the peripheral sides of the display region in a direction towards the peripheral sides of the protective layer, at least two alignment grooves are defined on the peripheral sides of the protective layer, and the alignment grooves respectively one-to-one correspond to the alignment marks to align and attach the protective layer to the back surface of the display region;

the alignment marks have a first lateral surface and a second lateral surface disposed oppositely, and the alignment grooves have an opening and a bottom section;

the first lateral surface is located on a side away from the opening of the alignment grooves in a direction towards the peripheral sides of the display region and is spaced a first distance from the opening, and the second lateral surface is located within the opening of one of the alignment grooves in a direction towards the bottom section and is spaced a second distance from the bottom section; and the first distance or the second distance are dimensions of confirmed accuracy of the protective layer attached to the back surface of the display region.

2. The display module as claimed in claim 1, wherein two of the alignment marks are disposed on any peripheral side of the display region, two of the alignment grooves are defined on the peripheral sides of the protective layer, and the alignment grooves respectively one-to-one correspond to the alignment marks.

3. The display module as claimed in claim 1, wherein two adjacent peripheral sides of the display region are respectively provided with one of the alignment marks, two adjacent peripheral sides of the protective layer are respectively provided with one of the alignment grooves, and the alignment groove respectively one-to-one correspond to the alignment mark.

4. The display module as claimed in claim 1, wherein two adjacent peripheral sides of the display region are respectively provided with two of the alignment marks, two adjacent peripheral sides of the protective layer are respectively provided with two of the alignment grooves, and the alignment grooves respectively one-to-one correspond to the alignment marks.

5. The display module as claimed in claim 1, wherein the alignment grooves penetrate the protective layer.

6. The display module as claimed in claim 1, wherein the protective layer comprises at least one of lattice gel, acrylic foam, polyimide, graphite, or copper foil.

7. A manufacturing method of a display module, comprising:

providing a display panel, wherein the display panel has a display region, the display region has peripheral sides and a back surface, and at least two alignment marks are disposed on the peripheral sides of the display region in a direction towards the peripheral sides of the protective layer;

providing a protective layer, wherein the protective layer has peripheral sides, and at least two alignment grooves are defined on the peripheral sides of the protective layer, the peripheral sides of the protective layer being disposed within the peripheral sides of the display region;

attaching the protective layer to the back surface of the display region, and corresponding the alignment grooves to the alignment marks one-to-one, respectively;

obtaining distances between the first lateral surface of the alignment marks and the opening of the alignment grooves, or obtaining distances between the second lateral surface of the alignment marks and the correspondingly disposed bottom section of the alignment grooves to act as the dimensions of confirmed accuracy of the protective layer attached to the back surface of the display region;

adjusting an attaching position of the protective layer according to the dimensions of confirmed accuracy to align and attach the protective layer to the back surface of the display region;

wherein the alignment marks have a first lateral surface and a second lateral surface disposed oppositely, and the alignment grooves have an opening and a bottom section; and the first lateral surface is located on a side away from the opening of the alignment grooves in a direction towards the peripheral sides of the display region and is spaced a first distance from the opening, and the second lateral surface is located within the opening of one of the alignment grooves in a direction towards the bottom section and is spaced a second distance from the bottom section.

\* \* \* \* \*